(12) United States Patent
Nguyen et al.

(10) Patent No.: US 9,321,026 B2
(45) Date of Patent: Apr. 26, 2016

(54) SYSTEM AND METHOD FOR SEAL FLUSH

(71) Applicant: Chevron Phillips Chemical Company LP, The Woodlands, TX (US)

(72) Inventors: Thanh Nguyen, Sugarland, TX (US); John D. Hottovy, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 737 days.

(21) Appl. No.: 13/665,391

(22) Filed: Oct. 31, 2012

(65) Prior Publication Data

US 2014/0116513 A1    May 1, 2014

(51) Int. Cl.
| | |
|---|---|
| *B01J 19/00* | (2006.01) |
| *B01J 19/18* | (2006.01) |
| *F04D 7/04* | (2006.01) |
| *F04D 29/10* | (2006.01) |
| *F04D 29/12* | (2006.01) |
| *F04D 29/70* | (2006.01) |

(52) U.S. Cl.
CPC .......... *B01J 19/0073* (2013.01); *B01J 19/1837* (2013.01); *F04D 7/04* (2013.01); *F04D 29/106* (2013.01); *F04D 29/126* (2013.01); *F04D 29/708* (2013.01); *B01J 2219/00006* (2013.01); *B01J 2219/00247* (2013.01); *B01J 2219/00252* (2013.01); *B01J 2219/00256* (2013.01); *B01J 2219/00272* (2013.01); *Y10T 137/0318* (2015.04)

(58) Field of Classification Search
CPC .............. B01J 19/0073; B01J 19/1837; B01J 2219/00247; B01J 2219/00252; B01J 2219/00254; B01J 2219/00256
See application file for complete search history.

(56) References Cited

U.S. PATENT DOCUMENTS

| | | | |
|---|---|---|---|
| 3,405,109 A | 10/1968 | Rohlfing | |
| 4,051,717 A | 10/1977 | Miller | |
| 4,182,810 A | 1/1980 | Willcox | |
| 4,190,538 A | 2/1980 | Chen | |
| 2004/0212154 A1 | 10/2004 | Yada et al. | |
| 2012/0010376 A1 | 1/2012 | Coffy et al. | |

FOREIGN PATENT DOCUMENTS

| | | |
|---|---|---|
| EP | 1788005 A2 | 5/2007 |
| SG | 180130 A1 | 5/2012 |
| WO | 2007131646 A1 | 11/2007 |
| WO | 2011072850 A1 | 6/2011 |

OTHER PUBLICATIONS

International Patent Application No. PCT/US2013/067486, dated Jan. 27, 2014.

*Primary Examiner* — Lessanework Seifu
(74) *Attorney, Agent, or Firm* — Fletcher Yoder, P.C.

(57) ABSTRACT

Techniques are provided for seal flush systems. A system may include a reactor circulation pump configured to circulate a slurry through a polymerization reactor. The slurry may include an olefin monomer, a catalyst, and a diluent. The system may also include a catalyst-inhibiting additive system configured to supply a catalyst-inhibiting additive to a seal of the reactor circulation pump and a seal flush system configured to generate a seal flush mixture and supply the seal flush mixture to the seal of the reactor circulation pump.

20 Claims, 4 Drawing Sheets

SYSTEM AND METHOD FOR SEAL FLUSH

BACKGROUND

The present disclosure relates generally to seal flush systems, and more particularly, to seal flush systems for polymerization reactor systems.

This section is intended to introduce the reader to aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Polyolefins, such as polyethylene and polypropylene, may be prepared by particle form polymerization, also referred to as slurry polymerization. In this technique, feed materials, such as monomer, catalyst, slurry, and additives, are fed to a loop reactor to establish a slurry. In the loop reactor, the slurry is circulated while polymerization occurs, forming product slurry. The product slurry, which contains solid polyolefin particles in a liquid medium, is then taken off or withdrawn from the reactor.

In a loop polymerization operation, the fluid slurry is circulated around the loop reactor using one or more pumps, such as axial flow pumps having propellers disposed within the reactor. The pumps provide the motive force for circulation of the fluid slurry. In addition, the pumps may include a seal to help prevent leakage of the fluid slurry to the environment. A seal flush fluid may be provided to the seal to help lubricate and remove heat from the seal and/or clean surfaces of the seal, such as the seal faces.

It is now recognized that undesirable issues may arise when the flow of the seal flush to the pump is interrupted, discontinued, or lost. For example, the lack of lubrication may cause the seal to overheat, thereby causing leakage of the fluid slurry from the pump. In addition, it is now recognized that when the seal flush is lost, the fluid slurry may backflow into the seal, thereby causing undesired polymerization within the pump. The resulting polyolefin material may grow in size within the pump until the polyolefin contacts one or more stationary and/or moving surfaces of the pump. Such contact of the polyolefin with the internal surfaces of the pump may cause drag, wear, and other forces that contribute to seal degradation.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

Figure 1:
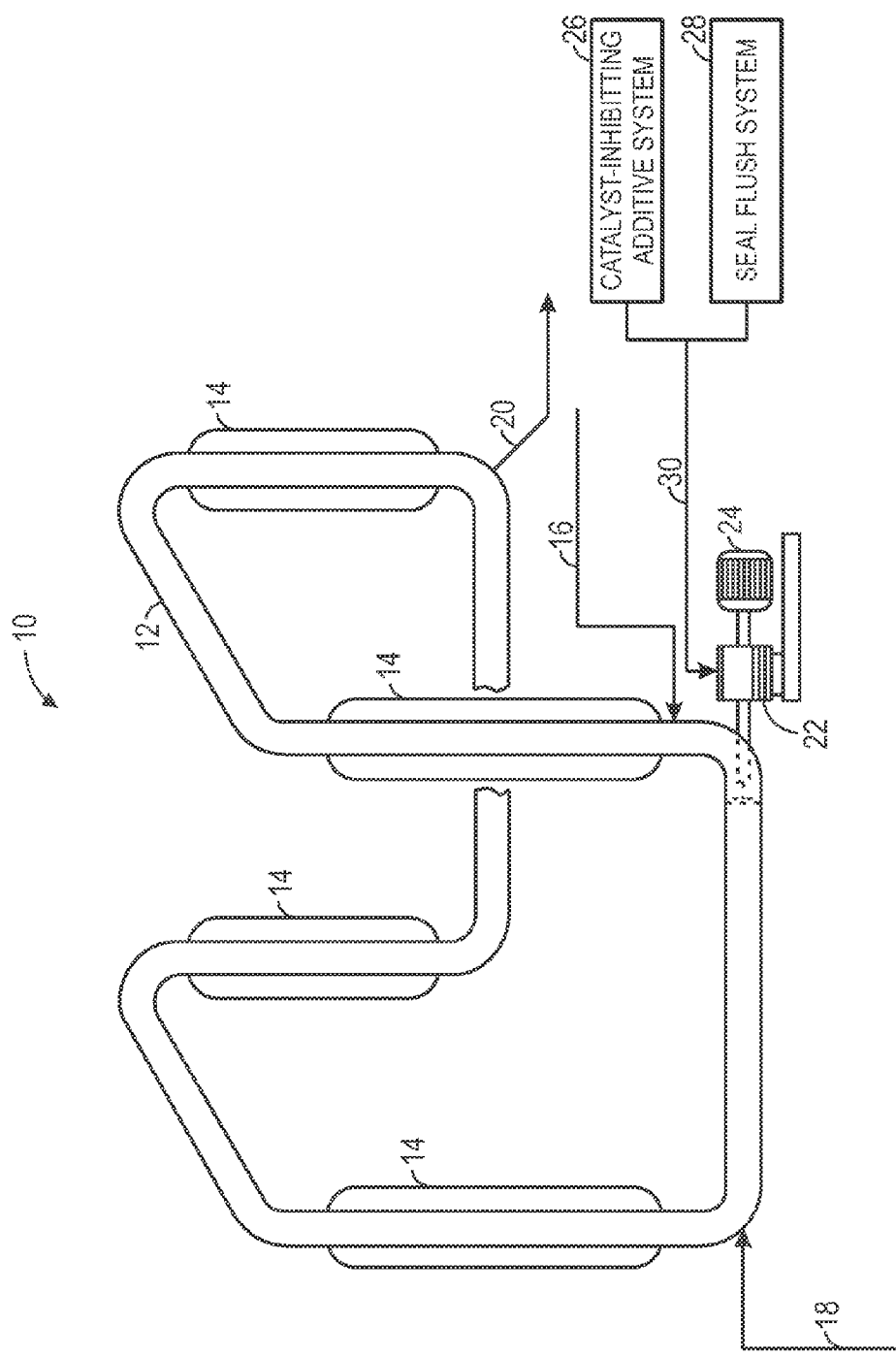
FIG. 1 is a schematic flow diagram of an embodiment of a polyolefin reaction system with a seal flush system in accordance with present embodiments.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to systems and methods for flushing a seal of a reactor circulation pump of a polymerization reactor (e.g., polyolefin reaction system) with a catalyst-inhibiting additive provided to a seal flush feature. The seal of the reactor circulation pump surrounds a shaft coupled to a hydraulic portion of the pump (e.g., an impeller or propeller in contact with the pumped fluid) and a driver (e.g., an electrical motor) and helps prevent leakage from the hydraulic portion, contains pressure within the hydraulic portion, and/or excludes contamination from entering the hydraulic portion. The catalyst-inhibiting additive may include any additive that inhibits the activity of catalyst circulated through the polymerization reactor and may be provided alone or mixed with seal flush, as a seal flush mixture, in accordance with present embodiments. The seal flush feature may be defined as an aspect of the reactor circulation pump configured to provide a flow path for a flushing fluid (e.g., catalyst-inhibiting additive or seal flush mixture) to pass over and flush out accumulated materials and heat from a seal of the reactor circulation pump. In operation, the seal may function to prevent leakage of slurry from the pump, and the seal flush techniques in accordance with present embodiments may facilitate maintenance of the seal and prevention of certain types of degradation of the seal.

The polyolefin reaction system, including components in accordance with present embodiments, may be part of a polymerization manufacturing facility that produces various polymers, such as, but not limited to, polyethylene and polypropylene. The reactor circulation pump may circulate a slurry through the polymerization reactor. Slurries may be defined as mixtures of one or more solids suspended in a liquid. The slurry circulated through the polymerization reactor may include an olefin monomer, a catalyst, a diluent, and other additives. As the slurry is circulated through the polymerization reactor, a polymerization reaction may occur to produce a polyolefin. In certain embodiments, a catalyst-inhibiting additive system may supply a catalyst-inhibiting additive to a seal of the reactor circulation pump via a seal flush feature of the reactor circulation pump. In addition, a seal flush system may generate a seal flush mixture and supply the seal flush mixture to the seal of the reactor circulation pump. In certain embodiments, the seal flush mixture may include one or more catalyst-inhibiting additives.

As indicated above, a catalyst-inhibiting additive may include any additive that may inhibit the activity of the catalyst circulated through the polymerization reactor. As such, when the catalyst-inhibiting additive is supplied to the seal of the reactor circulation pump, the catalyst-inhibiting additive may inhibit the activity of any catalyst present in the seal area of the reactor circulation pump. By inhibiting the activity of any catalyst present in the seal area of the reactor circulation pump, polymerization of any olefin monomer present in the seal area may also be inhibited. As described in detail below, in various embodiments, the catalyst-inhibiting additive and the seal flush may be supplied to the seal of the reactor circulation pump separately or together as the seal flush mixture. In further embodiments, one or more automation controllers may be configured to receive an input indicative of a demand for the catalyst-inhibiting additive and/or another input indicative of a demand for the seal flush mixture. The one or more automation controllers may be configured to activate an output to supply the catalyst-inhibiting additive to the seal of the reactor circulation pump and/or activate another output to supply the seal flush mixture to the seal of the reactor circulation pump.

By supplying the catalyst-inhibiting additive to the seal of the reactor circulation pump, certain undesirable conditions associated with the operation of the reactor circulation pump may be reduced and/or eliminated. For example, because of inclusion of the catalyst-inhibiting additive as a flushing fluid, present embodiments may address issues that result when the flow of the seal flush to the seal of the reactor circulation pump is interrupted or lost, which may result in backflow of slurry from the reactor to the seal area. For example, in normal operation, the pressure of the seal flush may be greater than that of the slurry in the reactor circulation pump. Thus, the seal flush normally flows through the seal and into the slurry pumped by the reactor circulation pump. However, when the flow of seal flush stops or the pressure of the seal flush falls below that of the slurry, the slurry may flow backward through the seal and enter portions of the seal area that normally only contain the seal flush. Without the presence of the catalyst-inhibiting additive in the seal area of the reactor circulation pump, polymerization may occur when the slurry backflows into the seal area. Thus, use of the catalyst-inhibiting additive in the seal area may help prevent conditions associated with undesired polymerization in the seal area. For example, the catalyst-inhibiting additive may help prevent drag, wear, and other forces associated with undesired polymerization that may eventually contribute to seal failure. These conditions may be caused when the polymer created by the undesired polymerization contacts moving or stationary components of the reactor circulation pump. In addition, use of the catalyst-inhibiting additive in the seal area may help prevent undesired polymerization from occurring on a back side of the reactor circulation pump propeller, thereby preventing pieces of the undesired polymer from blocking reactor outlets and/or inhibiting the pumping action of the propeller. Thus, addition of the catalyst-inhibiting additive to the seal area of the reactor circulation pump may increase the reliability of the reactor circulation pump, thereby reducing maintenance and other costs associated with the operation of reactor circulation pump.

FIG. 1 is a schematic representation of an exemplary polymerization reactor system 10 for producing polyolefins, such as polyethylene homopolymer, copolymer, and/or terpolymer, among others. The polymerization reactor system 10 may include one or more polymerization reactors of the same or different types. Furthermore, in multiple reactor systems, the reactors may be arranged in series or in parallel. To facilitate explanation, the following examples are limited in scope to specific reactor types believed to be familiar to those skilled in the art and to single reactors or simple combinations. To one of ordinary skill in the art using this disclosure, however, the present techniques are simply and easily applicable to more complex reactor arrangements, such as those involving additional reactors, different reactor types, and/or alternative ordering of the reactors or reactor types. Such arrangements are considered to be well within the scope of the present techniques.

The polymerization reactor system 10 includes a liquid phase reactor, such as a loop slurry reactor 12, generally composed of segments of pipe connected by smooth bends or elbows. For simplicity, FIG. 1 depicts a loop slurry reactor 12. However, in other embodiments, the present techniques may be similarly applicable to other types of liquid phase reactors. For example, the polymerization reactor system 10 may include other types of liquid phase reactors, such as autoclaves, boiling liquid-pool reactors, or vertical and/or horizontal loop slurry reactors, among others.

As shown, the loop slurry reactor 12 includes four vertical pipe legs formed integrally with horizontal pipe legs (or curved connecting members). According to certain embodiments, the pipe legs may be approximately 24 inches in diameter and approximately 200 feet in length, connected by pipe elbows at the top and bottom of the legs. However, in other embodiments, the diameter, length, number, and/or types of legs may vary. For example, in other embodiments, the loop slurry reactor 12 may include as many as eight to sixteen vertical pipe legs. Further, in other embodiments, more than sixteen vertical pipe legs may be included. In another example, the horizontal members may be eliminated while the vertical legs are connected through curved connecting members. Further, in another example, the pipe legs may be arranged horizontally without vertical pipe legs. In the illustrated embodiment, each leg includes a reactor jacket 14 that may remove heat from the exothermic polymerization via circulation of a cooling medium, such as treated water, through the reactor jacket 14.

As shown in FIG. 1, the loop slurry reactor 12 may receive various feed streams, which may include olefin monomers and comonomers, diluents, co-catalysts (e.g., alkyls, triethylboron, methyl aluminoxane, etc.), molecular weight control agents (e.g., hydrogen), and any other desired co-reactants or additives. For example, a first feed stream 16 may supply the olefin monomers, olefin comonomers, and diluent components to the loop slurry reactor 12 via inlets and conduits. In addition, a second feed stream 18 may supply the catalyst along with a diluent carrier to the loop slurry reactor 12 via inlets and conduits. For example, the catalyst may include particles suspended in the diluent carrier. The feed stream conduits may be connected to the loop slurry reactor 12 by flanges, welds, or other suitable types of attachments.

In general, the loop slurry reactor 12 may be used to carry out polyolefin polymerization under slurry conditions in which insoluble particles of polyolefin are formed in a fluid medium and are suspended as slurry within the loop slurry reactor 12. The polymer particles formed in the loop slurry reactor 12, as well as non-polymer components, such as the diluent, unreacted monomer/comonomer, and residual catalyst, may exit the loop slurry reactor 12 as effluent 20. After leaving the polymerization reactor system 10, the effluent 20 may be subsequently processed, such as by an effluent treatment system, to separate the non-polymer components (e.g., diluent, unreacted monomer, and comonomer) from the formed polymer particles. After separation, the formed polymer particles may exit the effluent treatment system as polymer fluff.

A motive device, such as pump 22, circulates the fluid slurry in the loop slurry reactor 12. According to certain embodiments, the pump 22 may be an in-line axial flow pump with a pump propeller disposed within the interior of the loop slurry reactor 12 to create a turbulent mixing zone within the fluid medium. The propeller also may assist in propelling the fluid medium through the closed loop of the loop slurry reactor 12 at sufficient speed to keep solid particulates, such as the catalyst and the polyolefin product, suspended within the fluid medium. The propeller may be driven by a motor 24 or other motive force.

As shown in FIG. 1, the polymerization reactor system 10 may include a catalyst-inhibiting additive system 26 that supplies the catalyst-inhibiting additive to the pump 22. In addition, the polymerization reactor system 10 may include a seal flush system 28 that supplies the seal flush to the pump 22. In certain embodiments, the catalyst-inhibiting additive and the seal flush may combine to form a seal flush mixture 30 that is supplied to the pump 22. In other embodiments, the catalyst-inhibiting additive and the seal flush may be supplied separately to the pump 22. As the catalyst-inhibiting additive system 26 is separate from the seal flush system 28, any interruption or loss of seal flush may not affect the catalyst-inhibiting additive system 26. In other words, if the flow of seal flush from the seal flush system 28 is interrupted or lost, the flow of the catalyst-inhibiting additive from the catalyst-inhibiting additive system 26 may continue. Thus, the catalyst-inhibiting additive may inhibit polymerization from occurring in the seal area of the pump 22 even if there is no flow of seal flush. Moreover, the catalyst-inhibiting additive may serve as a backup source of flushing fluid if the flow of seal flush from the seal flush system 28 is lost. In such situations, the flow rate of the catalyst-inhibiting additive to the seal may be increased to help provide sufficient lubrication and heat removal.

Figure 2:
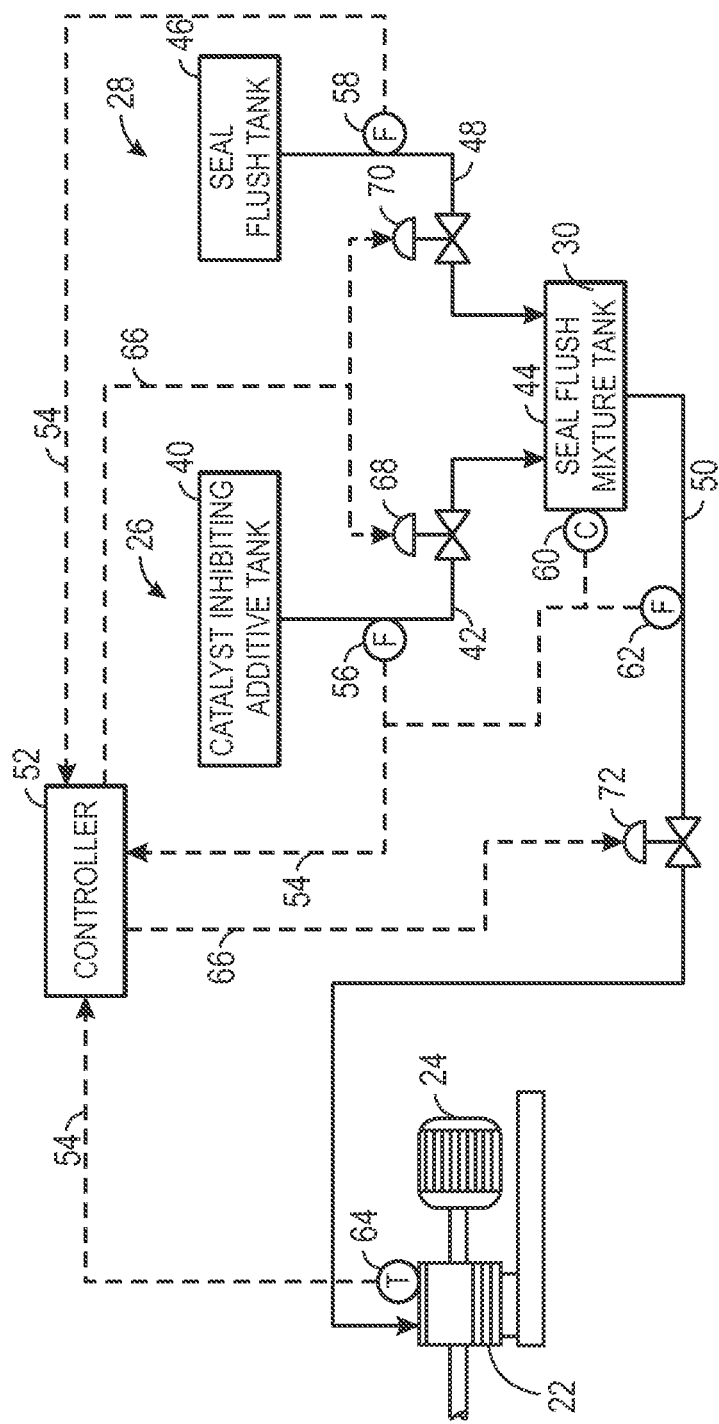
FIG. 2 is a schematic flow diagram of a catalyst-inhibiting additive system and a seal flush system including a seal flush mixture tank that may be employed with a reactor circulation pump of the polyolefin reaction system of FIG. 1, in accordance with present embodiments.

FIG. 2 depicts an embodiment of the catalyst-inhibiting additive system 26 and the seal flush system 28 in accordance with the present disclosure. As shown in FIG. 2, the catalyst-inhibiting additive system 26 includes a catalyst-inhibiting additive tank 40 to store the catalyst-inhibiting additive, which may include, but is not limited to, an anti-static agent, a catalyst poison, a catalyst inhibitor, an electron donor, a stereoregulator, a temper agent, a modifier, an adjuvant, a kill agent, an alcohol, water, a moderation system chemical, or any combination thereof. The catalyst-inhibiting additive may inhibit the activity of one or more catalysts present in the seal of the pump 22. Thus, the catalyst-inhibiting additive may reduce a polymerization rate of the olefin monomer while in contact with the seal of the pump 22. For example, the catalyst-inhibiting additive may help prevent undesired polymerization from occurring when the flow of seal flush to the seal of the pump 22 is lost and slurry backflows into the seal area. In addition, some catalyst-inhibiting additives may have uses elsewhere in the polymerization reactor system 10. For example, anti-static agents may help prevent polymer buildup on the inner walls of the loop slurry reactor 12. When the catalyst-inhibiting additive is an antistatic agent, the antistatic agent may be selected from a polysulfone, a polyamine, a sulfonic acid, toluene, or any combination thereof. In certain embodiments, the catalyst-inhibiting additive stored in the catalyst-inhibiting additive tank 40 may be diluted in a solvent to form a catalyst-inhibiting solution, which is then provided to the seal of the pump 22. In some embodiments, the catalyst-inhibiting additive is only supplied to the loop slurry reactor 12 via the seal of the pump 22. In other words, although the catalyst-inhibiting additive may be used to inhibit the activity of catalyst elsewhere in the polymerization reactor system 10 other than in the seal area of the pump 22, in such embodiments, the catalyst-inhibiting additive is not supplied via other conduits, inlets, or feed streams 16 or 18 of the loop slurry reactor 12. For example, in other embodiments, the catalyst-inhibiting additive may be supplied to the reactor system 10 through the seal area of the pump 22 and through the feed streams 16 or 18.

A catalyst-inhibiting additive transfer line 42 may be used to transfer the catalyst-inhibiting additive from the catalyst-inhibiting additive tank 40 to a seal flush mixture tank 44, which also receives seal flush from the seal flush system 28. The seal flush system 28 may include a seal flush tank 46 to store the seal flush. In certain embodiments, the seal flush may include, but is not limited to, isobutane. The seal flush may be used as the flushing fluid but typically does not have any inhibiting effect on any catalyst used in the polymerization reactor system 10. A seal flush transfer line 48 may be used to transfer the seal flush from the seal flush tank 46 to the seal flush mixture tank 44. Thus, the catalyst-inhibiting additive and the seal flush may combine to form the seal flush mixture 30, which may be stored in the seal flush mixture tank 44. In certain embodiments, the seal flush mixture tank 44 may include devices, such as an agitator, to help provide thorough mixing of the seal flush mixture 30. A seal flush mixture transfer line 50 may be used to transfer the seal flush mixture 30 from the seal flush mixture tank 44 to the seal of the pump 22. In certain embodiments, the seal flush mixture 30 may be pressured (e.g., via the use of nitrogen), pumped, conveyed, or otherwise transported from seal flush mixture tank 44 to the seal of the pump 22 via the seal flush mixture transfer line 50. As the seal flush mixture 30 includes the catalyst-inhibiting additive, the seal flush mixture may help prevent undesired polymerization from occurring in the seal area of the pump 22.

Operating conditions within the catalyst-inhibiting additive system 26 and/or the seal flush system 28 may be controlled to produce seal flush mixture 30 with desired properties. For example, a control system or controller 52 can be employed to control operating conditions within the polymerization reactor system 10, such as operating conditions of the catalyst-inhibiting additive system 26 and/or the seal flush system 28. Specifically, for example, the controller 52 may be employed to adjust the flow rates, and/or other properties of the catalyst-inhibiting additive, seal flush, and/or seal flush mixture 30. Moreover, the controller 52 may be employed to monitor and/or adjust operating conditions within the polymerization reactor system 10, such as temperatures, pressures, flow rates, among others. According to certain embodiments, the controller 52 may receive input signals 54 from sensors (e.g., temperature sensors, pressure sensors, and/or flow transducers) within the polymerization reactor system 10 that are indicative of operating conditions and may then generate control signals 66 to adjust operating conditions of the polymerization reactor system 10.

In certain embodiments, the input signal 54 received by the controller 52 may be indicative of a demand, or need, for the catalyst-inhibiting additive that can be interpreted based on certain measured values. For example, the input signal 54 may represent the flow rate of the catalyst-inhibiting additive through the catalyst-inhibiting additive transfer line 42, as transmitted by a catalyst-inhibiting additive flow sensor 56. The controller 52 may be programmed with a setpoint that would satisfy the demand for the catalyst-inhibiting additive by the polymerization reactor system 10. For example, the setpoint may be determined based on a total flow rate of material through the loop slurry reactor 12 and a ratio between the total flow and a desired flow of catalyst-inhibiting additive. If the flow rate of the catalyst-inhibiting additive, as measured by the catalyst-inhibiting additive flow sensor 56, is less than the setpoint, this may indicate demand for additional catalyst-inhibiting additive. Thus, the controller 52 may send an appropriate output signal 66 to increase the flow rate of the catalyst-inhibiting additive. The input signal 54 may also represent a concentration of the catalyst-inhibiting additive in the seal flush mixture 30, as transmitted by a seal flush mixture concentration sensor 60. If the measured concentration of the catalyst-inhibiting additive, as measured by the sensor 60, is less than a concentration setpoint, this may indicate demand for additional catalyst-inhibiting additive. The input signal 54 may be indicative of a demand for the seal flush by representing a flow rate of the seal flush, as transmitted by a seal flush flow sensor 58. In further embodiments, the input signal 54 received by the controller 52 may be indicative of a demand for the seal flush mixture 30 by representing a flow rate of the seal flush mixture, as transmitted by a seal flush mixture flow sensor 62 disposed in the seal flush mixture transfer line 50. In other embodiments, the demand for the seal flush mixture 30 may be represented by a temperature of the seal area of the pump 22, as transmitted by a seal temperature sensor 64. If the measured temperature of the seal area, as measured by the sensor 64, is greater than a temperature setpoint, this may indicate demand for additional seal flush mixture 30. For example, lack of seal flush mixture 30 in the seal area may cause friction or reduce the amount of removed heat, which may cause an increase in temperature.

The controller 52 may activate various output signals 66 in response to the demands, as indicated by the various input signals 54. For example, the controller 52 may activate an output, such as an actuator for a catalyst-inhibiting additive control valve 68, to supply additional catalyst-inhibiting additive to the seal flush mixture tank 44. Similarly, the controller 52 may activate an output, such as an actuator for a seal flush control valve 70, to supply additional seal flush to the seal flush mixture tank 44. Thus, the controller 52 may use the control valves 68 and/or 70 to meet a desired concentration setpoint of the catalyst-inhibiting additive in the seal flush mixture 30. In certain embodiments, the desired concentration of the catalyst-inhibiting additive in the seal flush mixture 30 may be between approximately 50 ppm to 250 ppm, based on neat catalyst-inhibiting additive. Neat may refer to undiluted catalyst-inhibiting additive. In certain embodiments, the catalyst-inhibiting additive may be dissolved or mixed with a solvent to form a catalyst-inhibiting solution prior to addition to the seal flush. Thus, the neat concentration of the catalyst-inhibiting additive in the seal flush mixture 30 represents the concentration of only the catalyst-inhibiting additive in the seal flush mixture 30 and not the concentration of any catalyst-inhibiting additive solution. The disclosed concentrations of the catalyst-inhibiting additive may be concentrated enough to inhibit polymerization from occurring in the seal of the pump 22. Thus, lower concentrations of the catalyst-inhibiting additive may not be as effective to inhibit polymerization and higher concentrations may be wasteful. In other embodiments, any concentration of the catalyst-inhibiting additive in the seal flush mixture 30 may be used depending on the characteristics of the particular polymerization reactor system 10 and/or the desired degree of catalyst inhibition. The controller 52 may also activate an output, such as an actuator for a seal flush mixture control valve 72, to supply a desired flow rate of the seal flush mixture 30 to the seal of the pump 22.

According to certain embodiments, the controller 52 may be a Distributed Control System (DCS). The controller 52 may include one or more automation controllers, microprocessors, instruction set processors, graphics processors, analog to digital converters, interface boards, and/or related chip sets. Further, the controller 52 may cooperate with storage (e.g., memory) that stores executable code, data, and instructions for the controller 52. For example, the storage may store non-transitory machine-readable code for maintaining a flow rate of the catalyst-inhibiting additive to the seal of the pump 22 at a level above a threshold based on measured process variables. The storage may include volatile memory, such as random access memory, and/or non-volatile memory, such as read only memory, flash memory, a hard drive, or any other suitable optical, magnetic, or solid-state computer readable media, as well as a combination thereof. The controller 52 may also include a display and a user interface. According to certain embodiments, the display and the user interface may be part of an operator workstation. The display may display a variety of information about the polymerization reactor system 10. For example, the display may display graphs, trends, mass balances, energy balances, process data, such as measured process variables, and/or predictive data to facilitate user monitoring and control of the polymerization reactor system 10.

According to certain embodiments, the display may display screens of the user interface that facilitate entry of user inputs. For example, a user may enter desired operating parameters (e.g., setpoints) or adjustments that should be made to the polymerization reactor system 10. In certain embodiments, a user may review an essentially instantaneous reaction rate or trend shown on the display and may enter a desired catalyst-inhibiting additive feed rate value or catalyst-inhibiting additive feed rate adjustment. In another example, a user may adjust the temperature of the polymerization reactor system 12 or one or more of the feed rates through the user interface. However, in other embodiments, at least some of the operating conditions may be adjusted automatically by the controller 52. For example, in certain embodiments, the controller 52 may automatically adjust the flow rate of reactor seal flush mixture 30 to the seal of the pump 22 based on a measured flow rate of the seal flush mixture 30 or other measured conditions.

Figure 3:
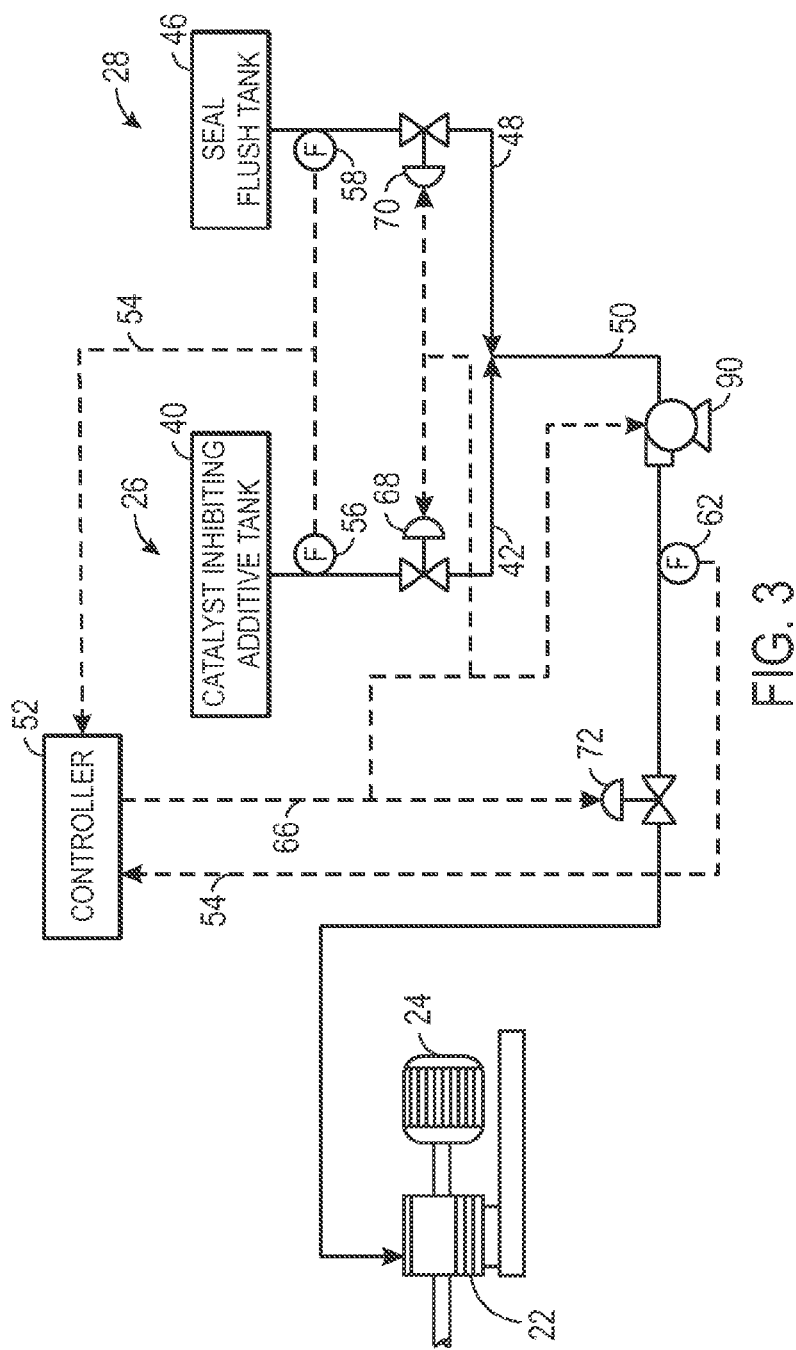
FIG. 3 is a schematic flow diagram of a catalyst-inhibiting additive system and a seal flush system including a seal flush mixture pump that may be employed with a reactor circulation pump of the polyolefin reaction system of FIG. 1, in accordance of present embodiments.

FIG. 3 depicts an embodiment of the catalyst-inhibiting additive system 26 and the seal flush system 28 that does not include the seal flush mixture tank 44. Specifically, the catalyst-inhibiting additive transfer line 42 and the seal flush transfer line 48 connect with one another to form the seal flush mixture transfer line 50. Thus, the catalyst-inhibiting additive and the seal flush may mingle to form the seal flush mixture as the additive and seal flush flow through the seal flush mixture transfer line 50.

In the embodiment illustrated by FIG. 3, a seal flush mixture pump 90 is also included. The seal flush mixture pump 90 may be used to transfer the seal flush mixture 30 to the seal of the pump 22. Specifically, the seal flush mixture pump 90 may be used to increase a pressure of the seal flush mixture 30 to enable the seal flush mixture 30 to enter the seal of the pump 22. For example, under certain conditions it may be necessary to overcome a pressure level within the pump 22. In other embodiments, the seal flush mixture pump 90 may be omitted and the seal flush mixture 30 may be pressured, conveyed, or otherwise transported to the seal of the pump 22. For example, the catalyst-inhibiting additive may be injected directly into the seal flush transfer line 48 to form the seal flush mixture 30 that is then conveyed to the pump 22 via the seal flush mixture transfer line 50. Similarly, in other embodiments, the seal flush mixture pump 90 may be configured to convey the seal flush mixture from the seal flush mixture tank 44 of the embodiment illustrated by FIG. 2. In other respects, the catalyst-inhibiting additive system 26 and the seal flush system 28 shown in FIG. 3 is similar to the systems shown in FIG. 2.

Figure 4:
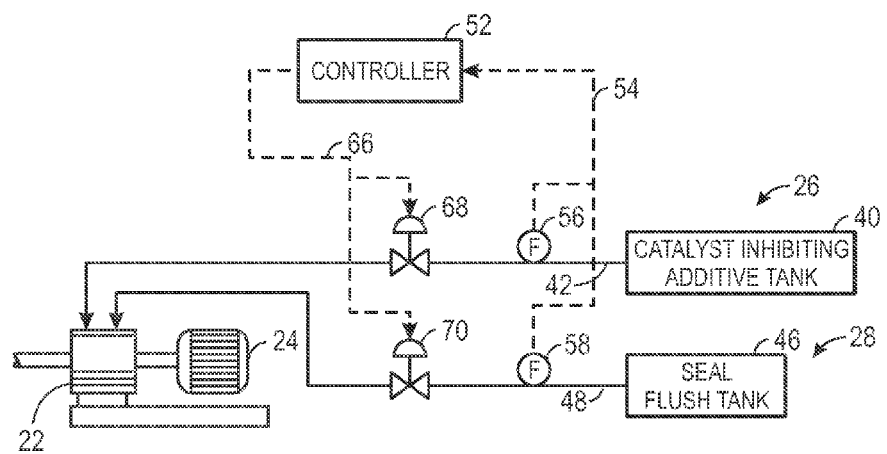
FIG. 4 is a schematic flow diagram of an embodiment of a catalyst-inhibiting additive tank and a seal flush tank with separate feed lines to a seal flush feature of a reactor circulation pump that may be employed in the polyolefin reaction system of FIG. 1, in accordance of present embodiments.

FIG. 4 depicts an embodiment of the catalyst-inhibiting additive system 26 and the seal flush system 28 that use separate transfer lines to the seal of the pump 22. Specifically, the catalyst-inhibiting additive transfer line 42 may be used to transfer the catalyst-inhibiting additive from the catalyst-inhibiting additive tank 40 directly to the seal of the pump 22. Similarly, the seal flush seal transfer line 48 may be used to transfer the seal flush from the seal flush tank 46 directly to the seal of the pump 22. The catalyst-inhibiting additive and the seal flush may mingle to form the seal flush mixture 30 within the seal of the pump 22. Pumps or other pressurization techniques may be used to transfer the catalyst-inhibiting additive and the seal flush to the seal of the pump 22 from the catalyst-inhibiting additive tank 40 and the seal flush tank 46, respectively. In other respects, the catalyst-inhibiting additive system 26 and the seal flush system 28 shown in FIG. 4 is similar to the system shown in FIG. 2.

Figure 5:
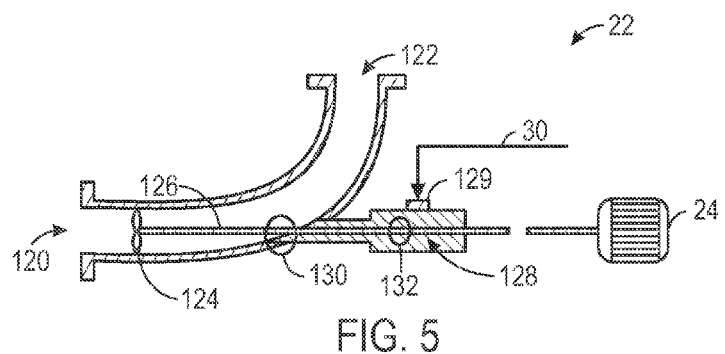
FIG. 5 is a cross sectional view of a reactor circulation pump supplied with a seal flush feature configured to receive a seal flush mixture from a seal flush system that may be employed with the polyolefin reaction system of FIG. 1, in accordance with present embodiments.

FIG. 5 depicts a cross sectional view of the pump 22 that may receive the catalyst-inhibiting additive and/or seal flush mixture 30. As shown in FIG. 5, the pump 22 includes an inlet 120 and an outlet 122. Thus, the contents of the loop slurry reactor 12 may enter at the inlet 120 and exit out the outlet 122. A propeller 124 may be connected to the motor 24 via a shaft 126 and used to propel the contents of the loop slurry reactor 12 out the outlet 122. A seal 128 may be used to help prevent leakage of slurry to the environment. As shown in FIG. 5, the seal flush mixture 30 may help lubricate and/or remove heat from the seal 128 via a seal flush feature 129, which is configured to provide a flow path for the seal flush mixture 30 to the seal 128. Numerous types of seals and seal flush plans exist and the disclosed embodiments may be used with any of them. As such, the seal 128 and seal flush feature 129 are shown generically in FIG. 5. In certain embodiments, the seal flush mixture 30 may be routed to various locations within the seal 128. For example, the seal flush mixture 30 may be routed to a first location (e.g., a seal flush outlet) 130 located between the seal 128 and the propeller 124. By providing the seal flush mixture 30 to the first location 130, the seal flush mixture 30 may help prevent undesired polymerization between the propeller 124 and the seal 128. The seal flush mixture 30 may also be provided to a second location 132 (e.g., an inboard seal). In one embodiment, the seal 128 includes a double seal, which includes an inboard seal and an outboard seal. The inboard seal may be located at an upstream location (e.g., closer to the propeller 124) of the seal 128 and the outboard seal may be located at a downstream location (e.g., closer to the motor 24) of the seal 128. The inboard seal may help prevent the liquid being pumped by the pump 22 from entering a space between the inboard and outboard seals (e.g., a seal chamber) and the outboard seal may help prevent the seal flush mixture in the space from leaking out of the seal 128. By providing the seal flush mixture 30 to the second location 132, undesired polymerization at the inboard seal may be reduced or prevented.

Additional Description

Systems and methods for catalyst preparation have been described. The following clauses are offered as further description of the disclosure.

Embodiment 1. A system, comprising: a reactor circulation pump configured to circulate a slurry through a polymerization reactor, wherein the slurry comprises an olefin monomer, a catalyst, and a diluent; a catalyst-inhibiting additive system configured to supply a catalyst-inhibiting additive to a seal of the reactor circulation pump; and a seal flush system configured to generate a seal flush mixture and supply the seal flush mixture to the seal of the reactor circulation pump.

Embodiment 2. The system of embodiment 1, wherein the seal flush mixture comprises one or more catalyst-inhibiting additives selected from an antistatic agent, a catalyst poison, a catalyst inhibitor, an electron donor, a stereoregulator, a temper agent, a modifier, an adjuvant, a kill agent, an alcohol, water, a moderation system chemical, or any combination thereof.

Embodiment 3. The system defined in any preceding embodiment, comprising one or more antistatic agents selected from a polysulfone, a polyamine, a sulfonic acid, toluene, or any combination thereof.

Embodiment 4. The system defined in any preceding embodiment, wherein the seal flush mixture is configured to reduce a polymerization rate of the olefin monomer while in contact with the seal of the reactor circulation pump.

Embodiment 5. The system defined in any preceding embodiment, wherein the seal flush system is configured to supply the seal flush mixture to an inboard seal of the seal, between the seal and a propeller of the reactor circulation pump, or any combination thereof.

Embodiment 6. The system defined in any preceding embodiment, wherein a concentration of catalyst-inhibiting additive in the seal flush mixture is between approximately 50 ppm to approximately 250 ppm, based on neat catalyst-inhibiting additive.

Embodiment 7. The system defined in any preceding embodiment, wherein the catalyst-inhibiting additive system is configured to supply the catalyst-inhibiting additive diluted in a solvent as a catalyst-inhibiting solution.

Embodiment 8. The system defined in any preceding embodiment, wherein the seal flush mixture comprises isobutane.

Embodiment 9. The system defined in any preceding embodiment, comprising a catalyst-inhibiting additive supply line configured to transfer the catalyst-inhibiting additive to a seal flush mixture supply line configured to transfer the seal flush mixture to the seal.

Embodiment 10. A method, comprising: supplying a seal flush mixture comprising a catalyst-inhibiting additive to a seal of a reactor circulation pump to reduce polymerization of an olefin monomer in contact with the seal.

Embodiment 11. The method or system defined in any preceding embodiment, wherein the catalyst-inhibiting additive is selected from an antistatic agent, a catalyst poison, a catalyst inhibitor, an electron donor, a stereoregulator, a temper agent, a modifier, an adjuvant, a kill agent, an alcohol, water, a moderation system chemical, or any combination thereof.

Embodiment 12. The method or system defined in any preceding embodiment, comprising supplying the seal flush mixture to an inboard seal of the seal, between the seal and a propeller of the reactor circulation pump, or any combination thereof.

Embodiment 13. The method or system defined in any preceding embodiment, wherein a concentration of the catalyst-inhibiting additive in the seal flush mixture is between approximately 50 ppm to approximately 250 ppm, based on neat catalyst-inhibiting-additive.

Embodiment 14. The method or system defined in any preceding embodiment, comprising adding the catalyst-inhibiting additive to a seal flush line configured to supply the seal flush mixture to the reactor circulation pump.

Embodiment 15. The method or system defined in any preceding embodiment, comprising supplying the catalyst-inhibiting additive to a polymerization reactor having the reactor circulation pump such that the catalyst-inhibiting additive is only supplied to the polymerization reactor in the seal flush mixture via the reactor circulation pump.

Embodiment 16. A system, comprising: one or more automation controllers configured to: receive a first input indicative of a demand for a catalyst-inhibiting additive; activate a first output to supply the catalyst-inhibiting additive to a seal of a reactor circulation pump; receive a second input indicative of a demand for a seal flush mixture; and activate a second output to supply the seal flush mixture to the seal of the reactor circulation pump.

Embodiment 17. The method or system defined in any preceding embodiment, wherein the one or more automation controllers are configured to: receive a third input indicative of a demand for a seal flush; and activate a third output to supply the seal flush to be combined with the catalyst-inhibiting additive to generate the seal flush mixture.

Embodiment 18. The method or system defined in any preceding embodiment, wherein the third output comprises a seal flush control valve actuator, a seal flush pump actuator, or any combination thereof.

Embodiment 19. The method or system defined in any preceding embodiment, wherein the first output comprises a catalyst-inhibiting control valve actuator, a catalyst-inhibiting pump actuator, or any combination thereof.

Embodiment 20. The method or system defined in any preceding embodiment, wherein the second output comprises a seal flush mixture control valve actuator, a seal flush mixture pump actuator, or any combination thereof.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A system, comprising:
   a reactor circulation pump configured to circulate a slurry through a polymerization reactor, wherein the slurry comprises an olefin monomer, a catalyst, and a diluent;
   a catalyst-inhibiting additive system configured to supply a catalyst-inhibiting additive to a seal of the reactor circulation pump; and
   a seal flush system configured to generate a seal flush mixture and supply the seal flush mixture to the seal of the reactor circulation pump.

2. The system of claim 1, wherein the seal flush mixture comprises one or more catalyst-inhibiting additives selected from an antistatic agent, a catalyst poison, a catalyst inhibitor, an electron donor, a stereoregulator, a temper agent, a modifier, an adjuvant, a kill agent, an alcohol, water, a moderation system chemical, or any combination thereof.

3. The system of claim 2, comprising one or more antistatic agents selected from a polysulfone, a polyamine, a sulfonic acid, toluene, or any combination thereof.

4. The system of claim 2, wherein the seal flush mixture is configured to reduce a polymerization rate of the olefin monomer while in contact with the seal of the reactor circulation pump.

5. The system of claim 2, wherein the seal flush system is configured to supply the seal flush mixture to an inboard seal of the seal, between the seal and a propeller of the reactor circulation pump, or any combination thereof.

6. The system of claim 2, wherein a concentration of catalyst-inhibiting additive in the seal flush mixture is between approximately 50 ppm to approximately 250 ppm, based on neat catalyst-inhibiting additive.

7. The system of claim 1, wherein the catalyst-inhibiting additive system is configured to supply the catalyst-inhibiting additive diluted in a solvent as a catalyst-inhibiting solution.

8. The system of claim 1, wherein the seal flush mixture comprises isobutane.

9. The system of claim 1, comprising a catalyst-inhibiting additive supply line configured to transfer the catalyst-inhibiting additive to a seal flush mixture supply line configured to transfer the seal flush mixture to the seal.

10. The system of claim 1, wherein the seal flush system comprises a seal flush mixture tank, the catalyst-inhibiting additive system is configured to supply at least a portion of the catalyst-inhibiting additive to the seal flush mixture tank, and a seal flush line is configured to supply the seal flush mixture from the seal flush mixture tank to the reactor circulation pump.

11. The system of claim 1, comprising:
    one or more automation controllers comprising a memory and a processor, the memory storing instructions executable by the processor to:
      receive a first input indicative of a demand for the catalyst-inhibiting additive;
      activate a first output to supply the catalyst-inhibiting additive to the seal of the reactor circulation pump;
      receive a second input indicative of a demand for the seal flush mixture; and
      activate a second output to supply the seal flush mixture to the seal of the reactor circulation pump.

12. The system of claim 11, wherein the instructions are executable by the processor to:
    receive a third input indicative of a demand for a seal flush; and
    activate a third output to supply the seal flush to be combined with the catalyst-inhibiting additive to generate the seal flush mixture.

13. The system of claim 12, wherein the third output comprises a seal flush control valve actuator, a seal flush pump actuator, or any combination thereof.

14. The system of claim 11, wherein the first output comprises a catalyst-inhibiting additive control valve actuator fluidly coupled to the catalyst-inhibiting additive system and the seal of the reactor circulation pump, a catalyst-inhibiting additive pump actuator fluidly coupled to the catalyst-inhibiting additive system and the seal of the reactor circulation pump, or any combination thereof.

15. The system of claim 11, wherein the second output comprises a seal flush mixture control valve actuator fluidly coupled to the seal flush system and the seal of the reactor circulation pump, a seal flush mixture pump actuator fluidly coupled to the seal flush system and the seal of the reactor circulation pump, or any combination thereof.

16. The system of claim 1, comprising a seal flush mixture pump configured to pressurize the seal flush mixture.

17. The system of claim 16, wherein the seal flush pump is configured to supply the seal flush mixture at a pressure greater than the slurry.

18. The system of claim 16, comprising a seal flush mixture pump configured to pressurize the seal flush mixture to the first pressure.

19. The system of claim 1, wherein the reactor circulation pump comprises a seal flush feature configured to direct the seal flush mixture to the seal of the reactor circulation pump.

20. A system, comprising:
- a polymerization reactor configured to produce a polyolefin product by subjecting a slurry comprising an olefin monomer, a catalyst, and a diluent to polymerization conditions;
- a reactor circulation pump configured to circulate the slurry through the polymerization reactor, wherein the reactor circulation pump comprises a seal configured to contact the slurry during operation;
- a catalyst-inhibiting additive tank configured to supply a catalyst-inhibiting additive to the reactor circulation pump; and
- a seal flush tank configured to supply a seal flush to the reactor circulation pump; and
- wherein the catalyst-inhibiting additive and the seal flush form a seal flush mixture, and the seal flush mixture is configured to inhibit activity of the catalyst at the seal, and thereby substantially block polymerization of the olefin monomer at the seal to reduce seal degradation.

* * * * *